(12) United States Patent
Herriman et al.

(10) Patent No.: US 10,926,709 B2
(45) Date of Patent: Feb. 23, 2021

(54) VEHICLE RACK SYSTEM FOR STACKED LADDERS

(71) Applicant: Adrian Steel Company, Adrian, MI (US)

(72) Inventors: Elizabeth Elaine Herriman, Adrian, MI (US); Mark Anthoney Henry, Adrian, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 16/665,680

(22) Filed: Oct. 28, 2019

(65) Prior Publication Data

US 2020/0172017 A1 Jun. 4, 2020

Related U.S. Application Data

(60) Provisional application No. 62/773,519, filed on Nov. 30, 2018.

(51) Int. Cl.
*B60R 9/00* (2006.01)
*B60R 9/042* (2006.01)
*B60R 9/048* (2006.01)
*B60R 11/00* (2006.01)

(52) U.S. Cl.
CPC .......... *B60R 9/0423* (2013.01); *B60R 9/0485* (2013.01); *B60R 2011/004* (2013.01); *B60R 2011/0071* (2013.01)

(58) Field of Classification Search
CPC ................ B60R 9/0423; B60R 9/0485; B60R 2011/004; B60R 2011/0071

USPC ........................................................ 224/310
See application file for complete search history.

(56) References Cited

U.S. PATENT DOCUMENTS

| | | | | |
|---|---|---|---|---|
| 3,251,519 A * | 5/1966 | Jones | ..................... | B60R 9/0485 224/324 |
| 3,963,136 A * | 6/1976 | Spanke | ................. | B60R 9/0423 414/462 |
| 5,058,791 A * | 10/1991 | Henriquez | ............ | B60R 9/0423 224/310 |
| 5,297,912 A * | 3/1994 | Levi | ...................... | B60R 9/0423 414/462 |
| 5,850,891 A * | 12/1998 | Olms | .................... | B60R 9/0423 182/127 |
| 5,884,824 A * | 3/1999 | Spring, Jr. | .............. | B60R 9/042 224/309 |
| 6,092,972 A * | 7/2000 | Levi | ...................... | B60R 9/0423 224/310 |
| 6,099,231 A * | 8/2000 | Levi | ...................... | B60R 9/0423 224/310 |
| 6,315,181 B1 | 11/2001 | Bradley et al. | | |
| 6,360,930 B1 | 3/2002 | Flickenger | | |
| 6,427,889 B1 | 8/2002 | Levi | | |
| 6,561,396 B2 * | 5/2003 | Ketterhagen | .......... | B60R 9/042 224/310 |

(Continued)

*Primary Examiner* — Peter N Helvey
(74) *Attorney, Agent, or Firm* — Marshall & Melhorn, LLC

(57) ABSTRACT

A ladder rack system for accommodating at least two stacked ladders thereon is disclosed. The system may have a stationary forward roof rail and a stationary rear roof rail. Pivotable ladder rack rear and pivotable ladder rack forward rails may also be provided. The ladder rack rear and forward rails may be selectively moved with respect to the stationary forward and rear roof rails via links that are connected to a connector bar and lever arm.

14 Claims, 15 Drawing Sheets

(56) References Cited

U.S. PATENT DOCUMENTS

| | | | | |
|---|---|---|---|---|
| 6,764,268 | B2* | 7/2004 | Levi | B60R 9/0423 224/310 |
| 6,854,627 | B2* | 2/2005 | Foo | B60R 9/048 182/127 |
| 7,097,409 | B2 | 8/2006 | Richter | |
| 7,210,559 | B2 | 5/2007 | Hickey | |
| 7,549,831 | B2* | 6/2009 | Hendley | B60R 9/0423 224/310 |
| 7,681,853 | B2 | 3/2010 | Trusty et al. | |
| 8,511,525 | B1 | 8/2013 | Levi | |
| 8,631,905 | B2 | 1/2014 | Parrish | |
| 8,991,889 | B1 | 3/2015 | Levi et al. | |
| 9,132,780 | B2 | 9/2015 | Sautter, Jr. et al. | |
| 9,132,781 | B2 | 9/2015 | Thibault | |
| 9,156,411 | B2 | 10/2015 | Elezaj | |
| 9,193,304 | B2 | 11/2015 | Svaldi et al. | |
| 9,327,654 | B2 | 5/2016 | Richter et al. | |
| 9,415,726 | B2 | 8/2016 | Levi | |
| 9,481,313 | B2 | 11/2016 | Levi | |
| 9,783,119 | B1 | 10/2017 | Lachance et al. | |
| 9,796,340 | B2 | 10/2017 | Bharucha | |
| 9,987,995 | B2 | 6/2018 | Paunov et al. | |
| 10,189,418 | B2* | 1/2019 | Willis | B60R 9/0423 |
| 10,501,021 | B2* | 12/2019 | Livingston | B60R 9/042 |
| 10,766,427 | B2* | 9/2020 | Livingston | B60R 9/0423 |
| 2005/0079036 | A1* | 4/2005 | Richter | B60R 9/0423 414/462 |
| 2005/0236228 | A1* | 10/2005 | Thibault | B60R 9/0423 182/127 |
| 2009/0140021 | A1* | 6/2009 | Richter | E06C 5/04 224/310 |
| 2013/0334267 | A1* | 12/2013 | Sautter, Jr. | B60R 9/04 224/324 |
| 2018/0244208 | A1 | 8/2018 | Wills | |
| 2018/0257577 | A1 | 9/2018 | Livingston et al. | |
| 2018/0257578 | A1 | 9/2018 | Levi | |
| 2018/0345871 | A1 | 12/2018 | Levi | |

\* cited by examiner

VEHICLE RACK SYSTEM FOR STACKED LADDERS

CROSS REFERENCE TO RELATED APPLICATIONS

The present application claims the benefit to U.S. Provisional Patent Application No. 62/773,519 filed on Nov. 30, 2018, which is incorporated herein by reference in its entirety.

FIELD

The present disclosure relates to a rack system for a vehicle designed to accommodate a plurality of ladders that may be stacked on one another.

BACKGROUND

Ladder racks for vehicles are well-known devices. The racks are typically located on the exterior roof of a cargo type vehicle. The racks may be designed to lower a ladder mounted thereon to a height that is more convenient to reach than the roof of the vehicle.

The prior art ladder racks are usually limited in the number of ladders they are designed to accommodate. Users, however, often stack ladders on the racks so as to load the racks with as many ladders as possible. Users will use bungie cords, or other methods, in an attempt to secure the additional ladders to the racks. Unfortunately, these methods typically do not work which results in the ladders coming loose at times that are not planned. The ladders, which are often large and heavy, can damage themselves, the vehicle, surroundings and/or the users when they come loose from the rack.

In view of the disadvantages associated with the prior art, it would be advantageous for a ladder rack to able to safely, easily, inexpensively, and securely locate more than one ladder thereon.

SUMMARY

In an embodiment, a ladder rack system includes a first ladder rack rail pivotably mounted at angle to a stationary first roof rail and a second ladder rack rail pivotably mounted at an angle to a stationary second roof rail. Each of the first ladder rack rail and the second ladder rack rail has a roller on an end portion thereof. The ladder rack system also includes a rotatable connector bar extending transversely between and connected to each of the first roof rail and the second roof rail; a first arm extending vertically upward from the first roof rail and axially offset from the first ladder rack rail and a second arm extending vertically upward from the second roof rail and axially offset from the second ladder rack rail. The system further includes a forward link member having a first end and a second end, wherein the first end of the forward link member is connected to a portion of the connector bar and the second of the forward link member is pivotally connected to an inboard portion of the first ladder rack rail; a rear link member having a first end and a second end, wherein the first end of the rear link member is connected to a portion of the connector bar and the second of the rear link member is pivotally connected to an inboard portion of the second ladder rack rail; a plurality of link member stops mounted on inboard portions of each of the first roof rail and the second roof rail, wherein the link member stops are proximately adjacent to each of the first end of the forward link member and the second end of the rear link member; and a ladder lock attached to each of the first ladder rack rail and the second ladder rack rail.

In some embodiments, each of the first ladder rack rail and the second ladder rack rail are positioned at an angle with respect to the first roof rail and the second roof rail, respectively. Also, the forward link member is positioned at an angle with respect to the first ladder rack rail and the rear link member is positioned at angle with respect to the second ladder rack rail and the forward link member and the rear link member are transverse to the first roof rail and the second roof rail, respectively.

In some embodiments, each of the ladder locks extends radially outward from the first ladder rack rail and the second ladder rack rail and accommodates at least two ladders thereon. Each of the ladder locks is positioned between the inboard portions and the outboard portions of the first ladder rack rail and the second ladder rack rail. Also, each of the ladder locks comprises a curved hook member.

BRIEF DESCRIPTION OF THE FIGURES

The above, as well as other advantages, will become readily apparent to those skilled in the art from the following detailed description when considered in the light of the accompanying drawings in which.

DETAILED DESCRIPTION

It is to be understood that the device and method may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless expressly stated otherwise.

FIGS. 1-13 depict a ladder rack system 10 according to an embodiment of the disclosure. The ladder rack system 10 is designed to have a compact profile. More particularly, a compact height profile is desirable so that it is an option to include the ladder rack system 10 installed on a vehicle 12, such as a cargo van or other related utility or work vehicle. This is desirable since many vehicles are transported by train and there is a height limitation for accommodating these vehicles in a cargo car of the train. The compact profile is achieved via the structures and methods described herein.

The ladder rack system 10 is adapted to be located on at least a portion of a roof 14, a roof rack (not shown), and/or a utility rack (not shown) of the vehicle 12. The ladder rack system 10 allows one or more ladders 16 to be selectively stacked, stored, transported, and/or retained on the vehicle 12 without using any additional structure for securing the ladders 16.

Figure 1:
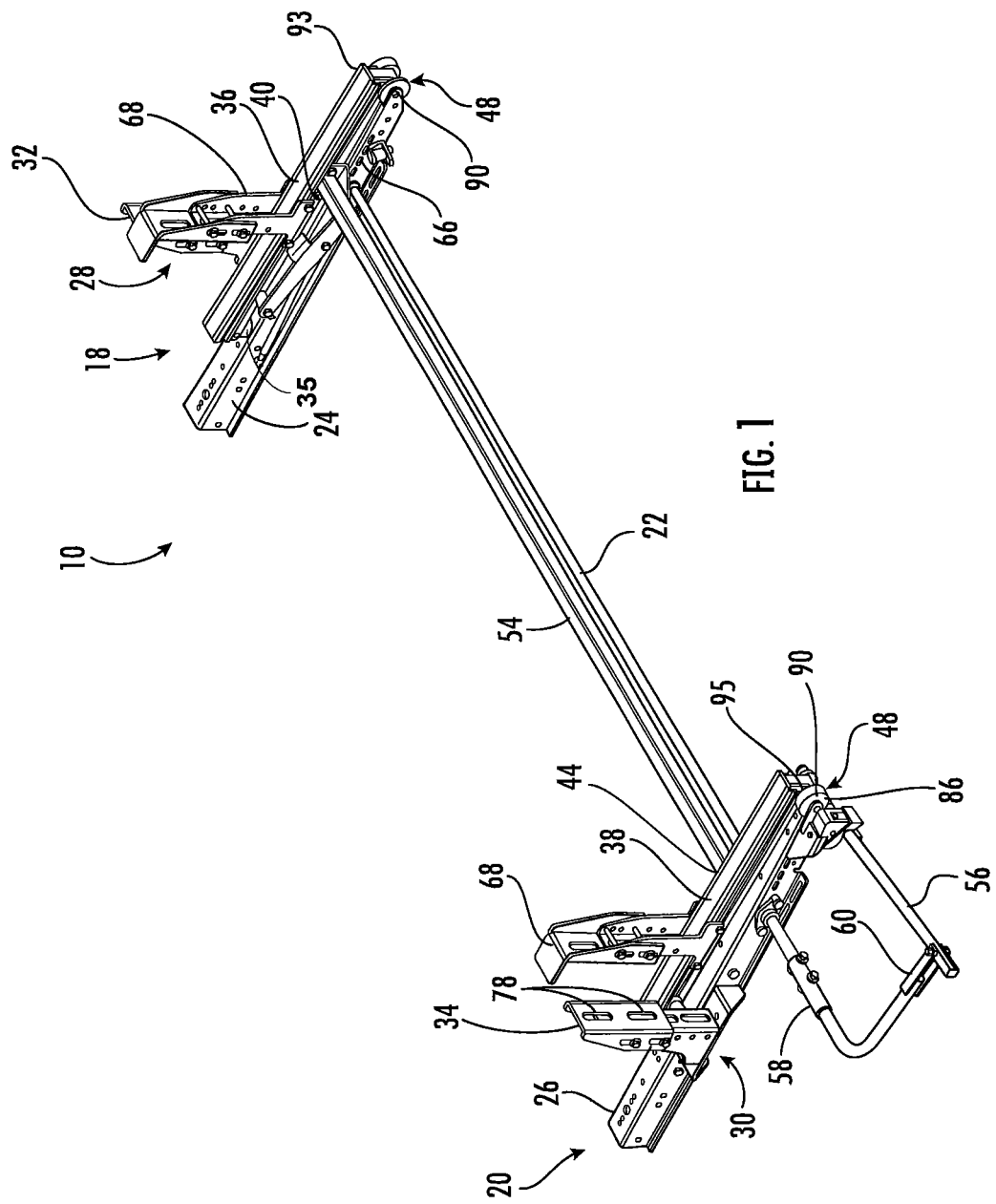
FIG. 1 is a schematic perspective view of an embodiment of a ladder rack system wherein the ladder rack system is in a first position.
Figure 2:
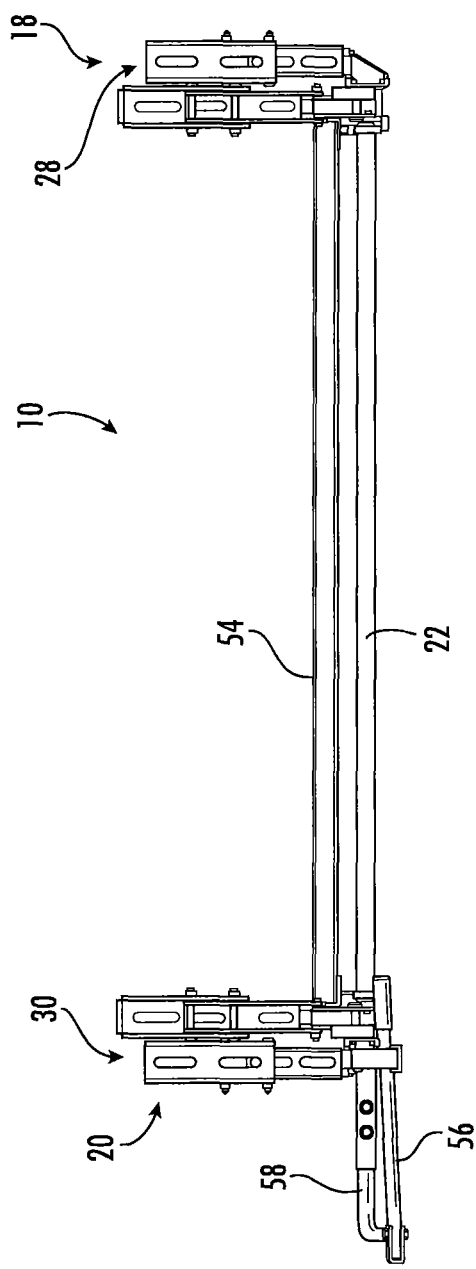
FIG. 2 is a schematic side perspective view of a portion of the ladder rack system illustrated in FIG. 1.

FIGS. 1-6 depict the ladder rack system 10 in a first, or stowed position. FIGS. 1 and 2 depict the ladder rack system 10 without ladders, while FIGS. 3-6 depict the ladder rack system 10 with a plurality of ladders 16 located/stowed either above or on a side of the vehicle 12.

The ladder rack system 10 includes a first assembly 18 mounted on an opposite end of the roof 14 of the vehicle 12 from a second assembly 20. The first assembly 18 and the second assembly 20 may be similar in their construction. In an embodiment, the first assembly 18 is operatively connected to the second assembly 20 by a connector bar 22.

In an embodiment, the first assembly 18 may be fixedly mounted to a first/forward roof rail 24 and the second assembly 20 may be fixedly mounted to a second/rear roof rail 26. Each of the first roof rail 24 and the second roof rail 26 may be unitary or may be comprised of multiple pieces. The first roof rail 24 and the second roof rail 26 may be fixedly mounted to opposite ends of the roof 14 of the vehicle 12 by a suitable fastening mechanism (not shown), such as a bracket and mechanical fasteners. In some embodiments, the ladder rack system 10 does not require a roof fastening mechanism.

As can be appreciated from FIGS. 1 and 2, the connector bar 22 extends transversely between, and connects with, the first roof rail 24 and the second roof rail 26. The connector bar 22 may be mounted for rotation with respect to the stationary first roof rail 24 and/or the stationary second roof rail 26 through bearings, bushings or the like. The connector bar 22 may extend along either a driver's side 80, also known as the road side, of the vehicle 12 or along a passenger's side 82, also known as the curb side, of the vehicle 12.

The terms driver's side, road side, passenger's side, and curb side, as shown in the figures, are relative to vehicle orientations as used in the United States. The ladder rack system 10, though, can be readily adapted for use with vehicles outside of the U.S. that may have opposite or different orientations than described and depicted herein.

In certain vehicles, the roof 14 may be curved. In one example, the vehicle 12 may have a generally higher point along a centerline 74 of the vehicle and the roof 14 may slope equally down and away from the centerline 74, as shown in FIGS. 3 and 4.

Figure 3:
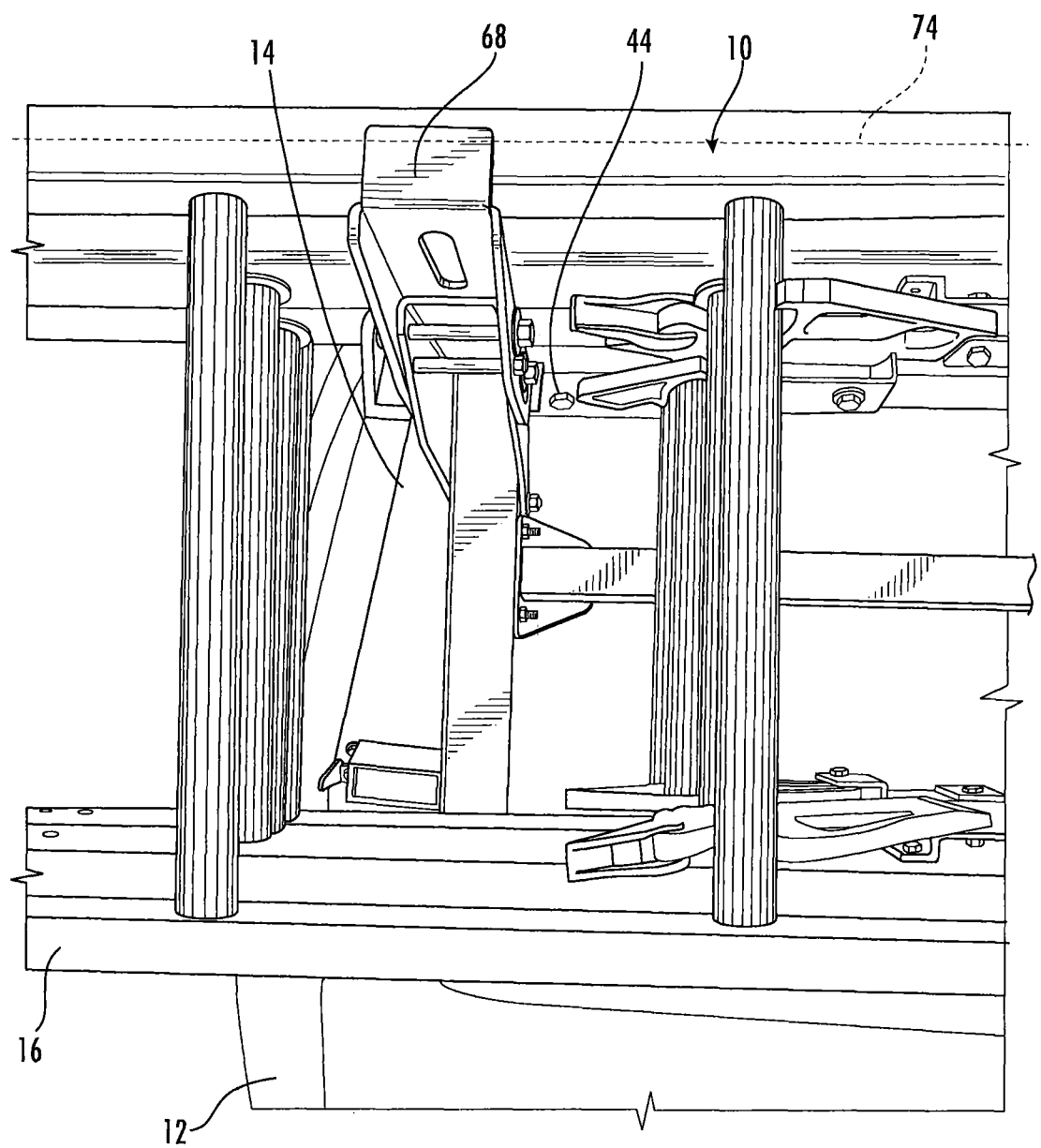
FIG. 3 is a schematic plan view of a portion of the ladder rack system illustrated in FIGS. 1 and 2 on the side of a vehicle.
Figure 4:
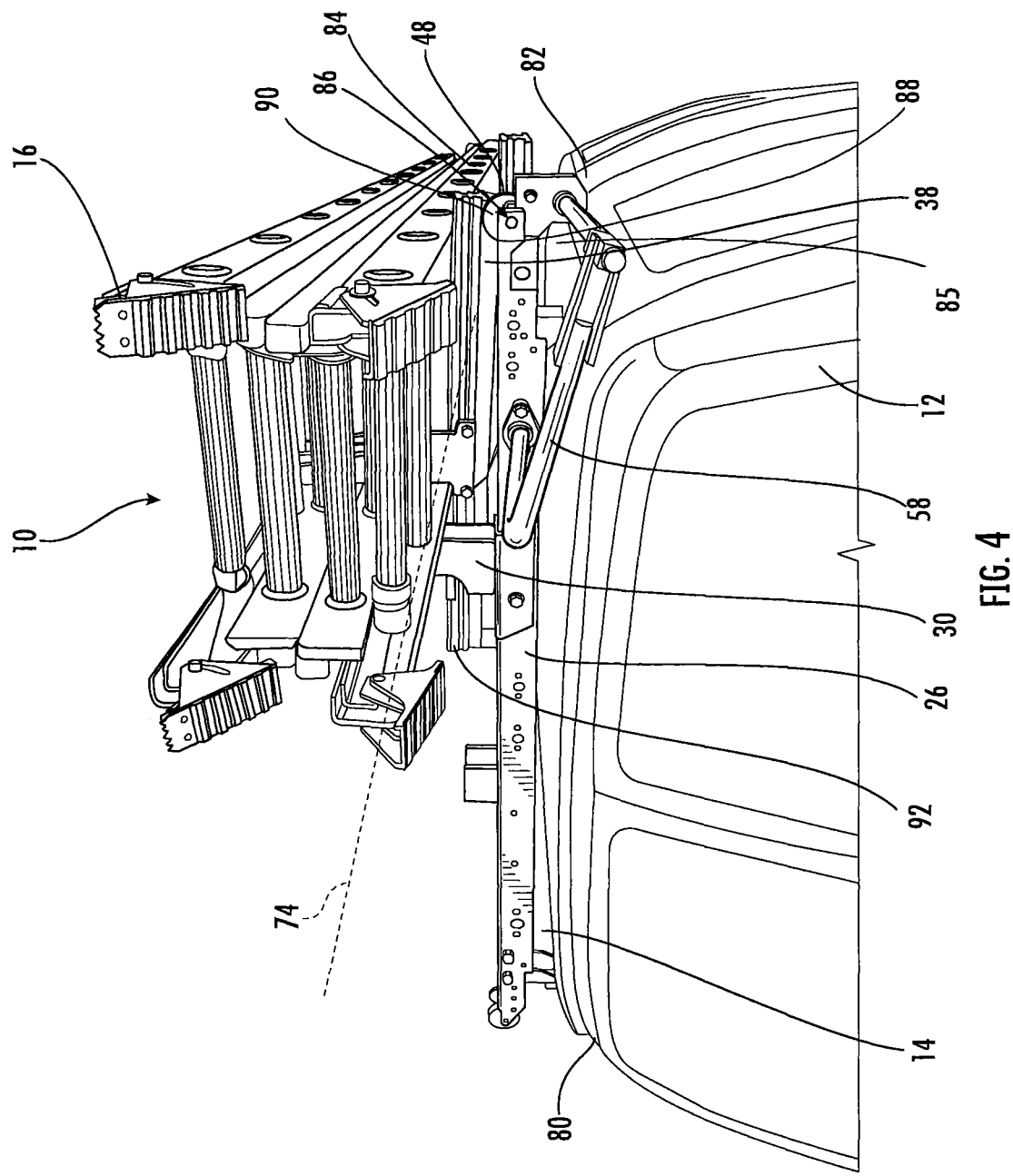
FIG. 4 is a schematic rear perspective view of the vehicle having the ladder rack system illustrated in FIGS. 1-3 and wherein the ladder rack system has a plurality of a ladders disposed thereon.
Figure 5:
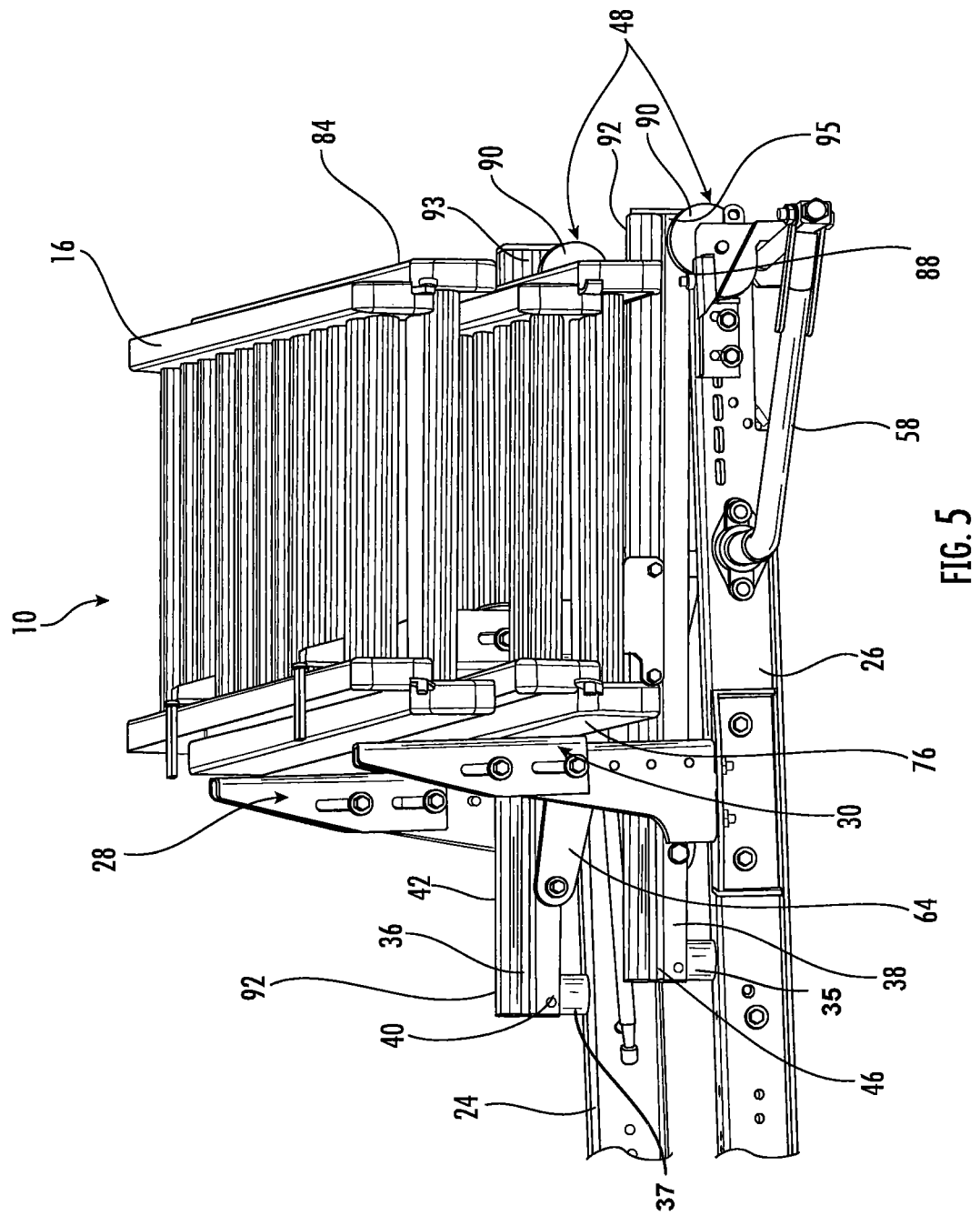
FIG. 5 is a schematic rear perspective view of a portion of the ladder rack system illustrated in FIGS. 1-4.

As seen in FIGS. 1, 3, and 5, the first assembly 18 includes a first ladder rack rail 36 that may be pivotally mounted to the first roof rail 24 and the second assembly 20 includes a second ladder rack rail 38 that may be pivotally mounted to the second roof rail 26. The first ladder rack rail 36 has an inboard portion 40 and an opposing outboard portion 42. Similarly, the second ladder rack rail 38 has an inboard portion 44 and an opposing outboard portion 46. The inboard portions 40, 44 are located near the centerline 74, as shown in FIG. 3.

In an embodiment, a first arm 28 extends vertically upward from the first roof rail 24 and is positioned beside the first ladder rack rail 36. Similarly, a second arm 30 extends vertically upward from the second roof rail 26 and is positioned beside the second ladder rack rail 38. As a result, the arms 28, 30 are axially offset from the ladder rack rails 36, 38.

The first arm 28 and/or the second arm 30 may be attached, such as bolted or fastened, to the first roof rail 24 and the second roof rail 26, respectively. However, it should be understood that the first arm 28 and the second arm 30 may be attached to the first roof rail 24 and the second roof rail 26, respectively, by any suitable securing means. Each of the arms 28, 30 may have vertically oriented fastener slots 78 therein. The slots 78 may accommodate fasteners to allow each of the arms 28, 30 to be selectively and vertically adjustable so as to permit vertical adjustment of the ladder rack rails 36, 38.

As best seen in FIGS. 1-3, a transverse member 54 may extend between the first ladder rack rail 36 and the second ladder rack rail 38. The transverse member 54 secures the first ladder rack rail 36 and the second ladder rack rail 38 together for stability and strength and to ensure simultaneous movement of the first ladder rack rail 36 and the second ladder rack rail 38. In an embodiment, the transverse member 54 is a unitary, axially-extending bar disposed perpendicular to both the first ladder rack rail 36 and the second ladder rack rail 38.

In an embodiment, the transverse member 54 is offset from the centerline 74 toward the passenger's side 82 of the vehicle 12 with respect to the first ladder rack rail 36 and the second ladder rack rail 38. However, it should be understood that the transverse member 54 may also be positioned in different locations in the ladder rack system 10.

Figure 11:
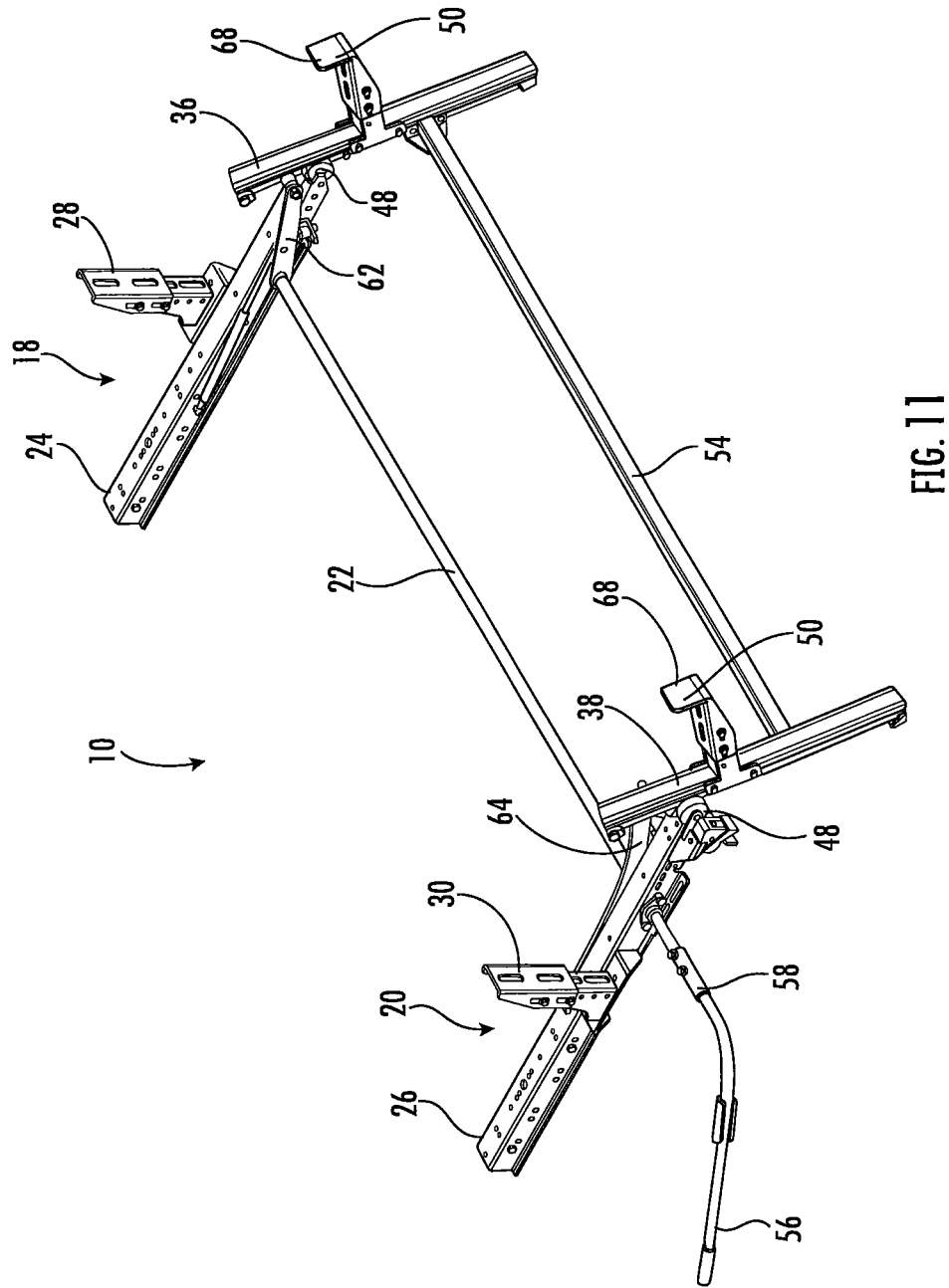
FIG. 11 is a schematic perspective view of the ladder rack system illustrated in FIGS. 1-10 wherein the ladder rack system is in a third position.

The transverse member 54 is substantially parallel to the connector bar 22 in the ladder rack system 10. As best shown in FIGS. 1 and 2, the distance between the transverse member 54 and the connector bar 22 is less in the first position as compared with the second and third positions. As best shown in FIG. 11, the distance between the transverse member 54 and the connector bar 22 is greater in the third position as compared with the first and second positions.

The first arm 28 includes a first upstanding portion 32 and the second arm 30 includes a second upstanding portion 34, wherein each of the first upstanding portion 32 and the second upstanding portion 34 extends at an angle relative to the first roof rail 24 and the second roof rail 26, respectively. Each of the first upstanding portion 32 and the second upstanding portion 34 may be positioned transverse to the first roof rail 24 and the second roof rail 26, respectively.

The first upstanding portion 32 and the second upstanding portion 34 may each be adjustable in the lateral and longitudinal positions. For example, each of the first upstanding portion 32 and the second upstanding portion 34 may be adjustable based on the width of the ladder racks to be accommodated. In an embodiment, the first upstanding portion 32 is disposed proximate to the inboard portion 40 of the first ladder rack rail 36 and the second upstanding portion 34 is disposed proximate to the inboard portion 44 of the second ladder rack rail 38. The first upstanding portion 32 and the second upstanding portion 34 may also be telescopically adjusted upward and downward along the first ladder rack rail 36 and the second ladder rack rail 38, respectively.

In an embodiment, both the first upstanding portion 32 and the second upstanding portion 34 extend above a top surface of both the first ladder rack rail 36 and the second ladder rack rail 38. The first upstanding portion 32 and the second upstanding portion 34 preferably extend above the top surfaces so that they at least equal or exceed the height of two ladders stacked on one another.

Each of the first arm 28 and the second arm 30 may provide a positive stop for at least a portion of the ladders 16 and may aid in securing at least a portion of the ladders 16 to at least a portion of the ladder rack system 10. Since ladders vary in their construction, the heights of the first arm 28 and the second arm 30 need to accommodate all or most of the ladders 16. As best shown in FIGS. 1 and 5 and as a non-limiting example, the first arm 28 and the second arm 30 are provided with an adjustable height via the fastener slots 78 therein in order to accommodate ladders of various constructions.

As best shown in FIG. 5 and as a non-limiting example, the ladders 16 include inboard portions 76 and opposing outboard portions 84. The inboard portions 76 of the ladders 16 are disposed proximate to the arms 28, 30 in the first position. Thus, the fixed arms 28, 30 may prevent inboard movement of the stacked ladders 16 in this position. As best shown in the embodiment of FIG. 4, the outboard portions 84 are disposed proximate to the passenger's side 82 of the vehicle 12 in the first position.

As seen in FIGS. 1, 4, and 5, each of the first ladder rack rail 36 and the second ladder rack rail 38 may be provided with a roller 48 on an outer end portion 93 of the first ladder rack rail 36 and on an outer end portion 95 of the second ladder rack rail 38. Each of the rollers 48 may have an "apple core" shape including a central core 86 connected to one or more wheels 90, wherein the central core 86 has a smaller diameter than the wheels 90. In the embodiment shown in FIG. 4, the central core 86 of each of the rollers 48 is located outwardly from a side wall 85 on the passenger's side 82 of the vehicle 12.

Figure 6:
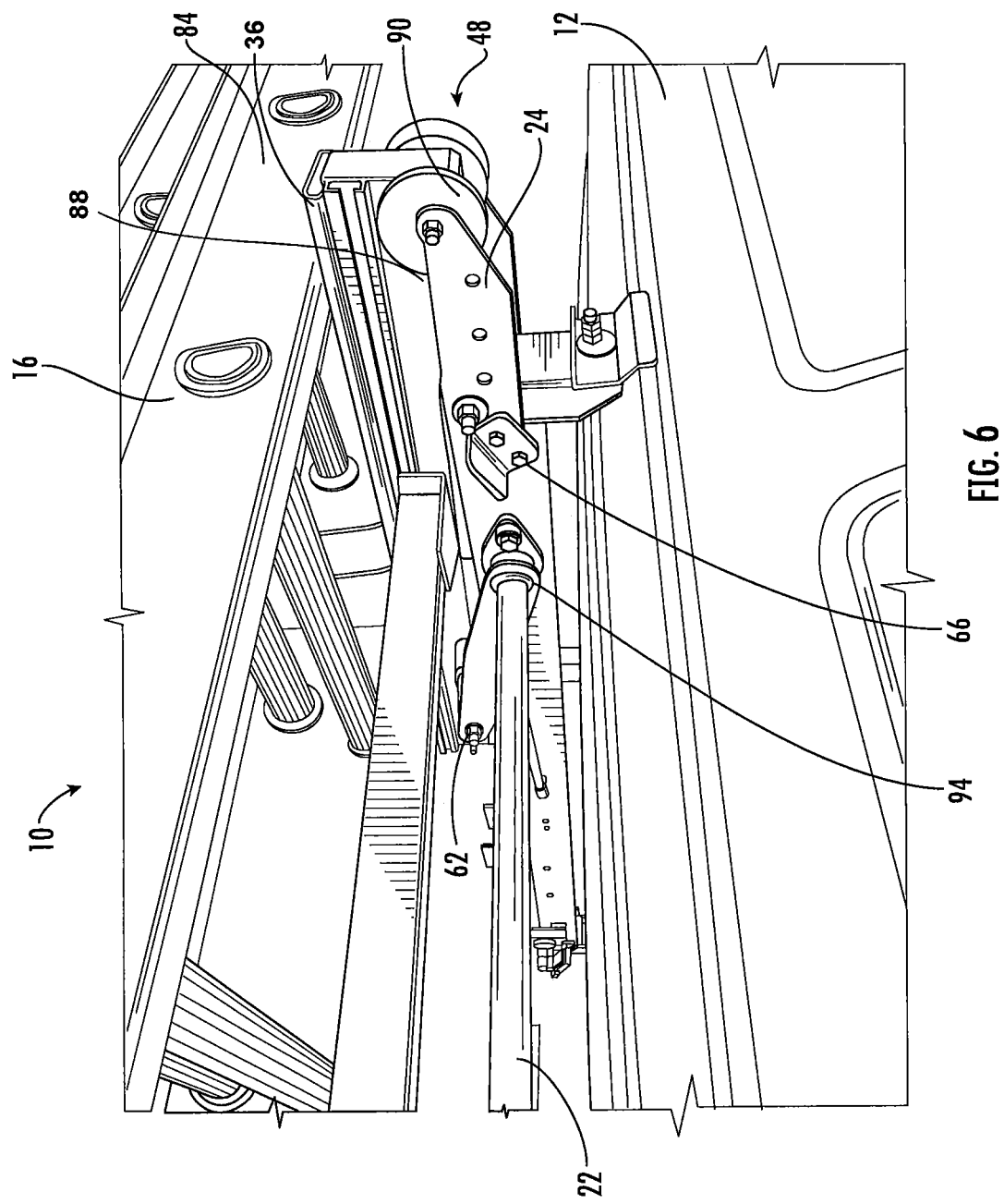
FIG. 6 is a schematic side perspective view of a portion of the ladder rack system illustrated in FIGS. 1-5 on the side of a vehicle.

As seen in FIG. 1, the first ladder rack rail 36 and the second ladder rack rail 38 are slideably engaged with the wheels 90. The wheels 90 may have the same width or different widths. As seen in FIG. 6, the wheels 90 may extend above the top surfaces of both the first roof rail 24 and the second roof rail 26 and may contact roller surfaces 88 on at least portions of each of the first ladder rack rail 36 and the second ladder rack rail 38. The roller surfaces 88 may extend at least partially along the length of the first ladder rack rail 36 and the second ladder rack rail 38. The roller surfaces 88 are parallel surfaces that are vertically offset (i.e. non-planar) from upper surfaces 92 on each of the first ladder rack rail 36 and the second ladder rack rail 38. The roller surfaces 88 preferably extend along both sides of both the first ladder rack rail 36 and the second ladder rack rail 38. Each of the roller surfaces 88 may be continuous and parallel to one another.

As seen in FIGS. 1 and 5, the arms 28, 30 orient the first ladder rack rail 36 and the second ladder rack rail 38 at an angle with respect to the first roof rail 24 and the second roof rail 26 using stoppers 35, 37 positioned on the upper surfaces of the first roof rail 24 and the second roof rail 26, respectively. The stoppers 35, 37 may be made from a variety of materials, including rubber. By positioning the first ladder rack rail 36 and the second ladder rack rail 38 at an angle with respect to the first roof rail 24 and the second roof rail 26, it may be easier to rotate the first ladder rack rail 36 and the second ladder rack rail 38 off of the first roof rail 24 and the second roof rail 26.

As shown in the figures of the present disclosure, an elongated handle rod 56 is operatively coupled to the connector bar 22 to allow a user change the heights of portions of the first assembly 18 and portions of the second assembly 20. One end of the handle rod 56 slides into the bottom of a lever arm 58 and engages to the lever arm 58 with a pin or other suitable fastener 60 located on the elongated handle rod 56. The handle rod 56 is extendable in length and may be provided with a telescopic feature so that its length may be adjusted in order to accommodate a particular user. The handle rod 56 is extended when it is desired to lower or raise the first assembly 18 and/or the second assembly 20. When not in use, the handle rod 56 may be collapsed to a non-extended state, removed from the lever arm 58, and stored in the vehicle 12 or elsewhere.

The lever arm 58 may be shaped and configured in any manner so long that the lever arm 58 is a sufficient length that the handle rod 56 is positioned at a convenient location for a user at the rear side of the vehicle 12. The location is designed to be at a height that most users can easily reach when standing on the ground beside the vehicle 12.

The lever arm 58 may be one piece, or it may be comprised of more than one piece. In the case where the lever arm 58 is comprised of more than one piece, the pieces may selectively move with respect to one another. The pieces of the lever arm 58 may collapse, telescope and/or fold onto one another to save space and to enable the lever arm 58 to be stored in a compact manner on the ladder rack system 10.

In an embodiment, the lever arm 58 extends to the second roof rail 26. More particularly, the lever arm 58 extends through the second roof rail 26 to the connector bar 22. The lever arm 58 may be supported for selective rotation through the second rear roof rail 26 in a bearing, bushing or the like.

Figure 7:
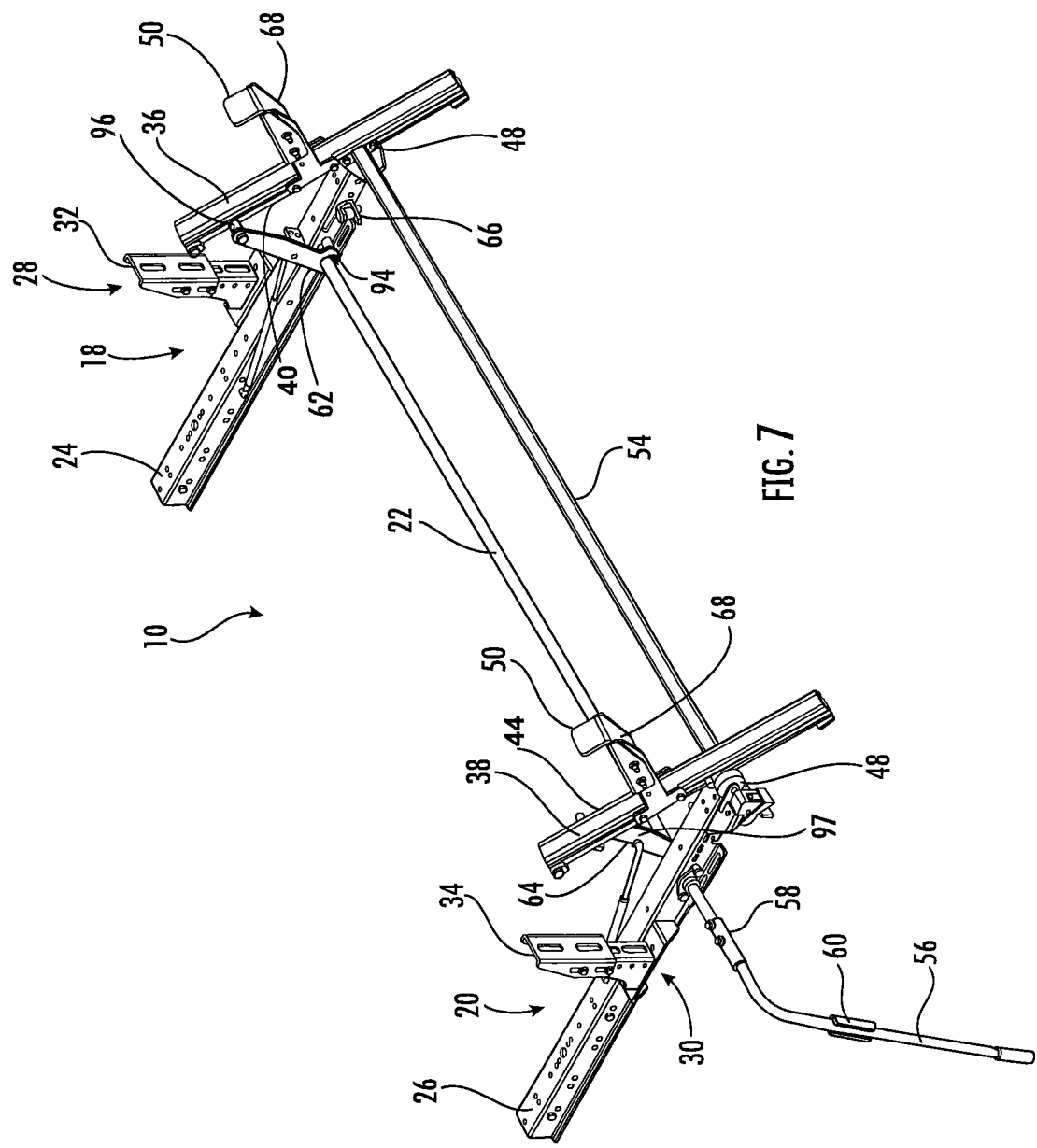
FIG. 7 is a schematic perspective view of the ladder rack system illustrated in FIGS. 1-6 wherein the ladder rack system is in a second position.
Figure 8:
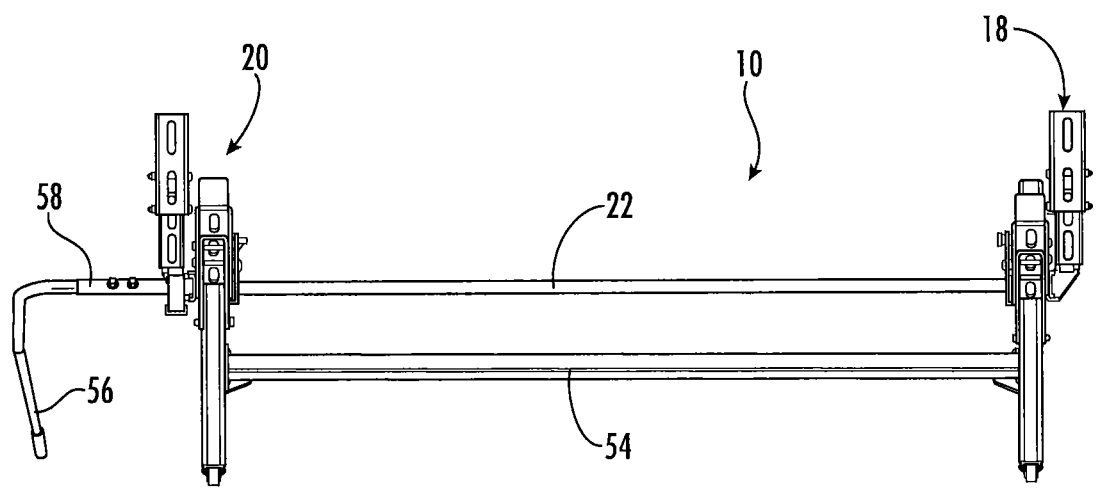
FIG. 8 is a schematic side perspective view of a portion of the ladder rack system illustrated in FIGS. 1-7 wherein the ladder rack system is in the second position illustrated in FIG. 7.
Figure 9:
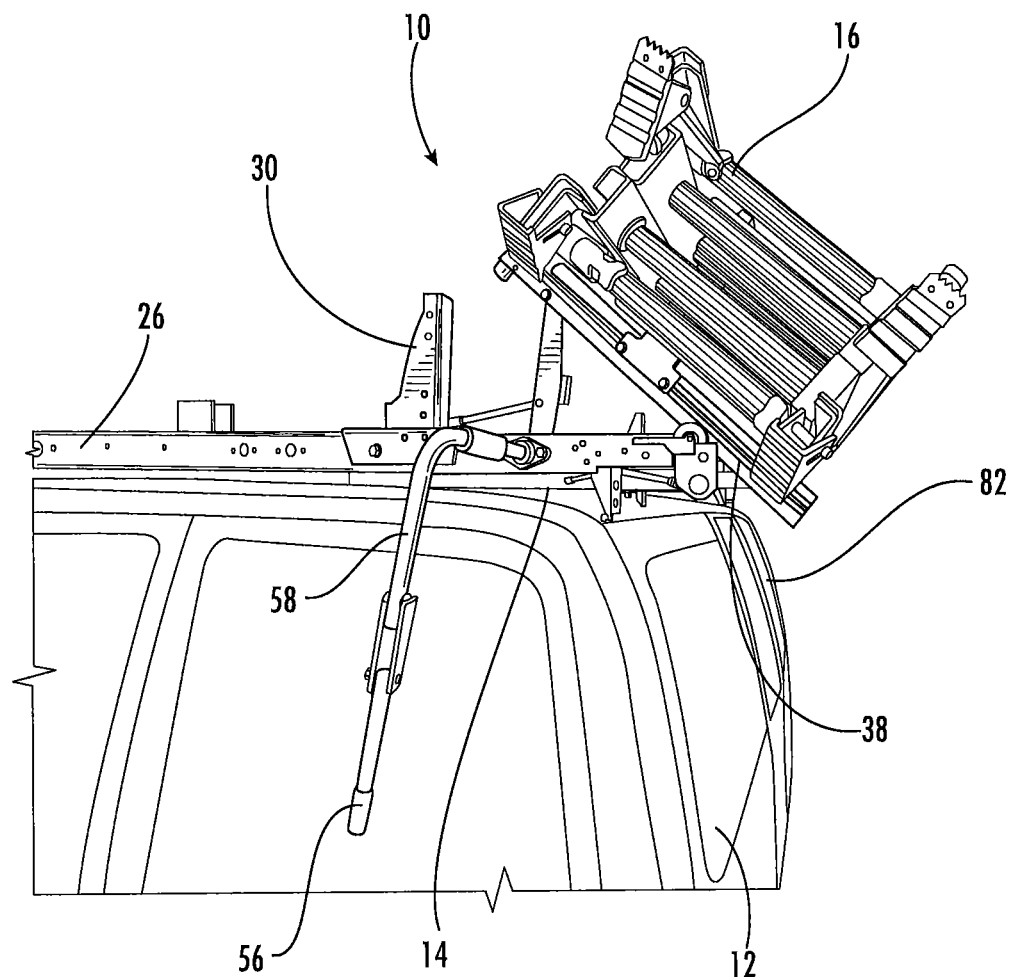
FIG. 9 is a schematic perspective view of the vehicle and the ladder rack system illustrated in FIGS. 1-8 wherein the ladder rack system is in the second position illustrated in FIGS. 7 and 8.

In an embodiment, at least one ladder lock 68 is attached to each of the first ladder rack rail 36 or the second ladder rack rail 38. As seen in FIGS. 7 and 11, the ladder locks 68 extend radially outward at an angle from portions of each of the first ladder rack rail 36 and the second ladder rack rail 38. The ladder locks 68 may extend to a height that is at least the height of the ladders 16 stacked on the first ladder rack rail 36 and second ladder rack rail 38 in order to accommodate the ladders 16.

The ladder locks 68 may be positioned between the inboard portions 40, 44 and the outboard portions 42, 46 of both of the first ladder rack rail 36 and the second ladder rack rail 38, respectively. In an embodiment, each of the ladder locks 68 are positioned on the first ladder rack rail 36 and the second ladder rack rail 38 so that they extend between two adjacent rungs on one or more of the stacked ladders 16. Each of the ladder locks 68 are positioned outboard from the first and second upstanding portions 32, 34. The ladder locks 68 may be secured to the first ladder rack rail 36 and the second ladder rack rail 38 with mechanical fasteners, but they may be moved inboard and outboard along the first ladder rack rail 36 and the second ladder rack rail 38 to adjust to the width of the ladders 16.

Each of the ladder locks 68 may take the form of curved hook members 50. However, it is understood that other configurations are possible for the ladder locks 68. The ladder locks 68 are configured to prevent the ladders 16 on the ladder rack system 10 from sliding or moving transversely (such as forward and back on the vehicle) with respect to the ladder locks 68. The ladder locks 68 are also configured to prevent the one or more ladders 16 on the ladder rack system 10 from moving laterally (such as side to side on the vehicle) with respect to the ladder locks 68. It can be appreciated that the ladder locks 68 and the first arm 28 and the second arm 30 effectively trap the side rails of one more ladders between them.

Figure 10:
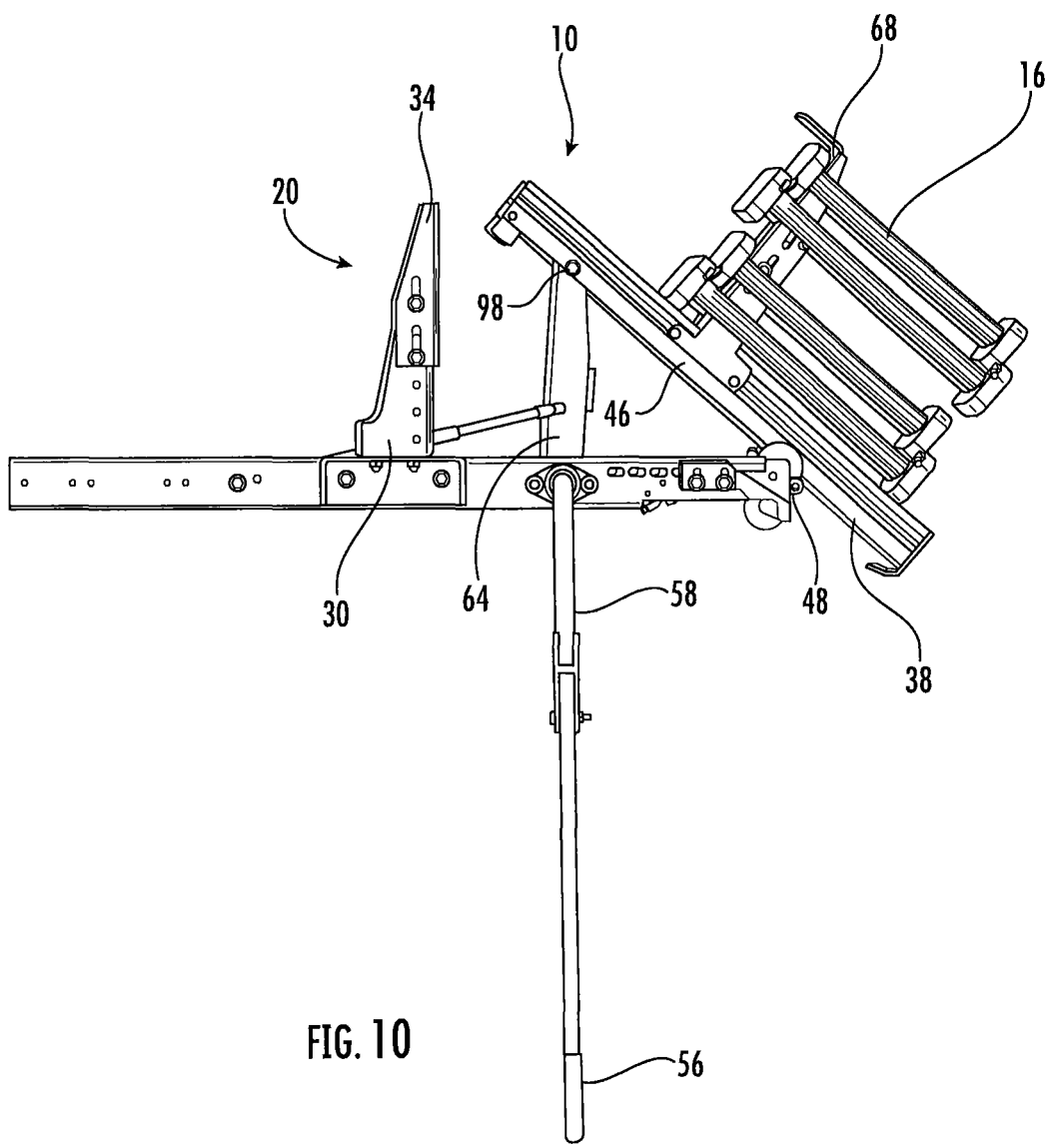
FIG. 10 is a schematic rear perspective view of a portion of the ladder rack system illustrated in FIGS. 1-9 wherein the ladder rack system is in the second position illustrated in FIGS. 7-9.

As best seen in FIGS. 7 and 10, the first assembly 18 further includes a forward link member 62 and the second assembly 20 further includes a rear link member 64. A first end 94 of the forward link member 62 is connected to a portion of the connector bar 22 and a second end 96 of the forward link member 62 is pivotally connected to the inboard portion 40 of the first ladder rack rail 36. Similarly, a first end 97 of the rear link member 64 is connected to a portion of the connector bar 22 and a second end 98 of the rear link member 64 is pivotally connected to the inboard portion 44 of the second ladder rack rail 38.

In an embodiment, the forward link member 62 and the rear link member 64 are secured to the first ladder rack rail 36 and the second ladder rack rail 38, respectively, by a fastener, such as a bolt. However, it should be understood that the forward link member 62 and the rear link member 64 may be connected to the first ladder rack rail 36 and the second ladder rack rail 38, respectively, by any suitable fastening means.

In some embodiments, the rotation of the lever arm 58 in a first direction rotates the connector bar 22, which results in the rotation of the forward link member 62 and the rear link member 64 from the first/stowed position to a third/extended position, as described below. In the third/extended position, the forward link member 62 and the rear link member 64 are angled with respect to the first ladder rack rail 36 and the second ladder rack rail 38.

As seen in FIG. 7; the rotation of the forward link member 62 and the rear link member 64, in turn, moves the inboard portion 40 of the first ladder rack rail 36 and the inboard portion 44 of the second ladder rack rail 38 upwardly along the path of an arc. Simultaneously, the outboard portions 42, 46 of the first ladder rack rail 36 and the second ladder rack rail 38 move downwardly along the rollers 48. As a result, the first ladder rack rail 36 and the second ladder rack rail 38 move from their stowed position above the vehicle 12 to a position angled off of the side of the vehicle 12, as best seen in FIGS. 9, 10, 12, and 13.

As the lever arm 58 is continued to be rotated in the first direction, the connector bar 22 continues to rotate the forward link member 62 and the rear link member 64. As seen in FIGS. 7 and 10, the forward link member 62 and the rear link member 64 may continue extending into a substantially vertical position that is transverse to the first roof rail 24 and the second roof rail 26. In this position, the inboard portions 40, 44 of the first ladder rack rail 36 and second ladder rack rail 38 may be at their highest position with respect to the first roof rail 24 and the second roof rail 26.

As best seen in FIGS. 1, 6, and 7, one or more link member stops 66 may be mounted on inboard portions of the first roof rail 24 and the second roof rail 26. The link member stops 66 are disposed proximate to the first end 94 of the forward link member 62 and the first end 97 of the rear link member 64. The link member stops 66 are also interposed between the connector bar 22 and the rollers 48. The link member stops 66 selectively receive the forward link member 62 and the rear link member 64 and prevent their further movement in the ladder rack system 10.

When the ladder rack system 10 is in a first/stowed position, the lever arm 58 may be extended by a user in order to use the handle rod 56 to rotate the lever arm 58. The lever arm 58 may be rotated in a first direction to move the first assembly 18 and the second assembly 20 from the first/stowed position to the second/intermediate position. To move the first assembly 18 and the second assembly 20 back to the first/stowed position, the lever arm 58 may be rotated in a second direction, which is generally opposite to the first direction. In an embodiment, the first direction is counterclockwise and the second direction is clockwise from the rear of the vehicle 12.

As shown in FIGS. 7-10, the first assembly 18 and the second assembly 20 have started to rotate in the second/intermediate position for the ladder rack system 10. In this position, the first ladder rack rail 36 and the second ladder rack rail 38 are positioned at an angle with respect to the first roof rail 24 and the second roof rail 26. The rotation of the first assembly 18 and the second assembly 20 is caused by the rotation of the lever arm 58 and the handle rod 56.

Figure 12:
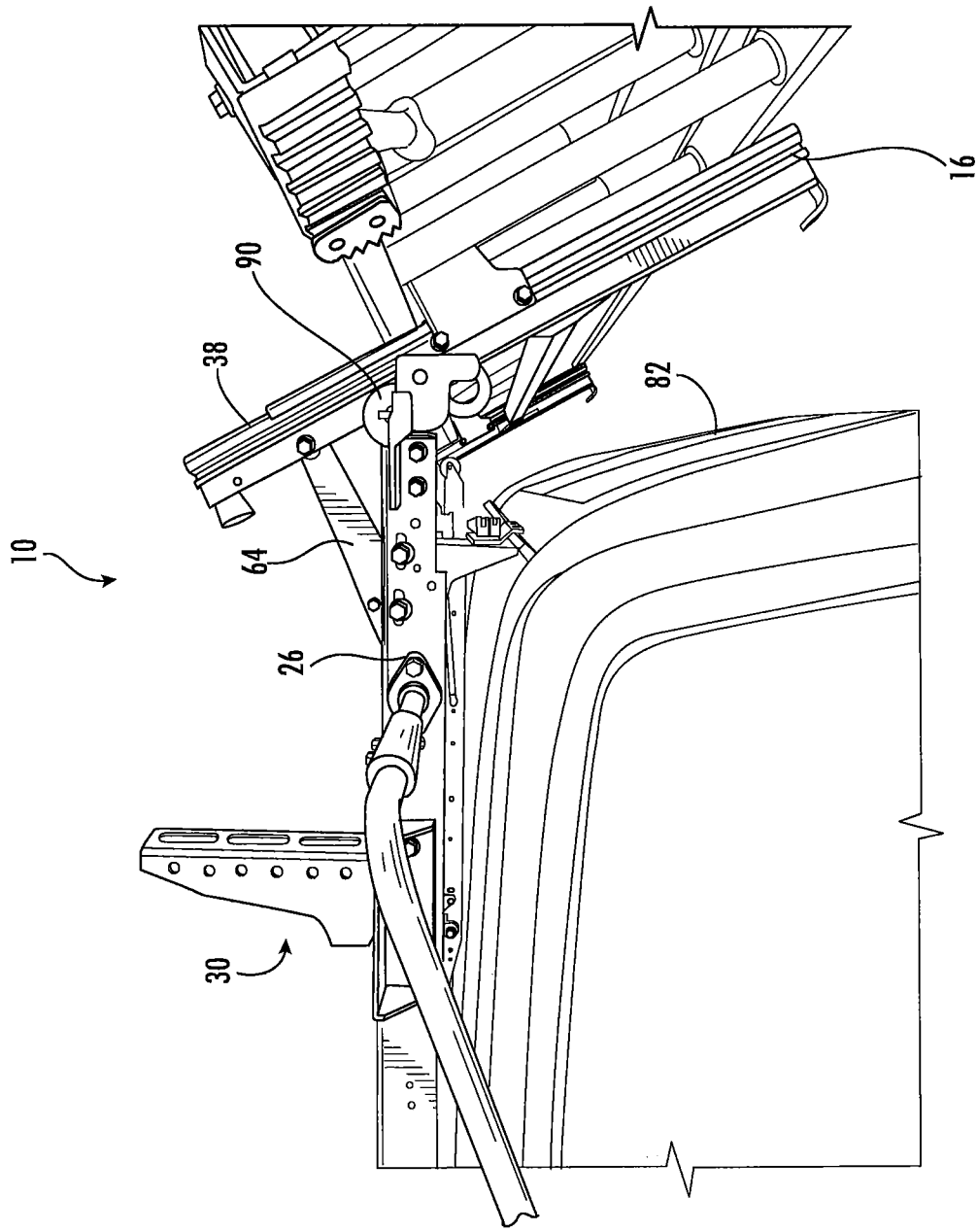
FIG. 12 is a schematic rear perspective view of the vehicle and the ladder rack system illustrated in FIGS. 1-11 wherein the ladder rack system is in the third position illustrated in FIG. 11.
Figure 13:
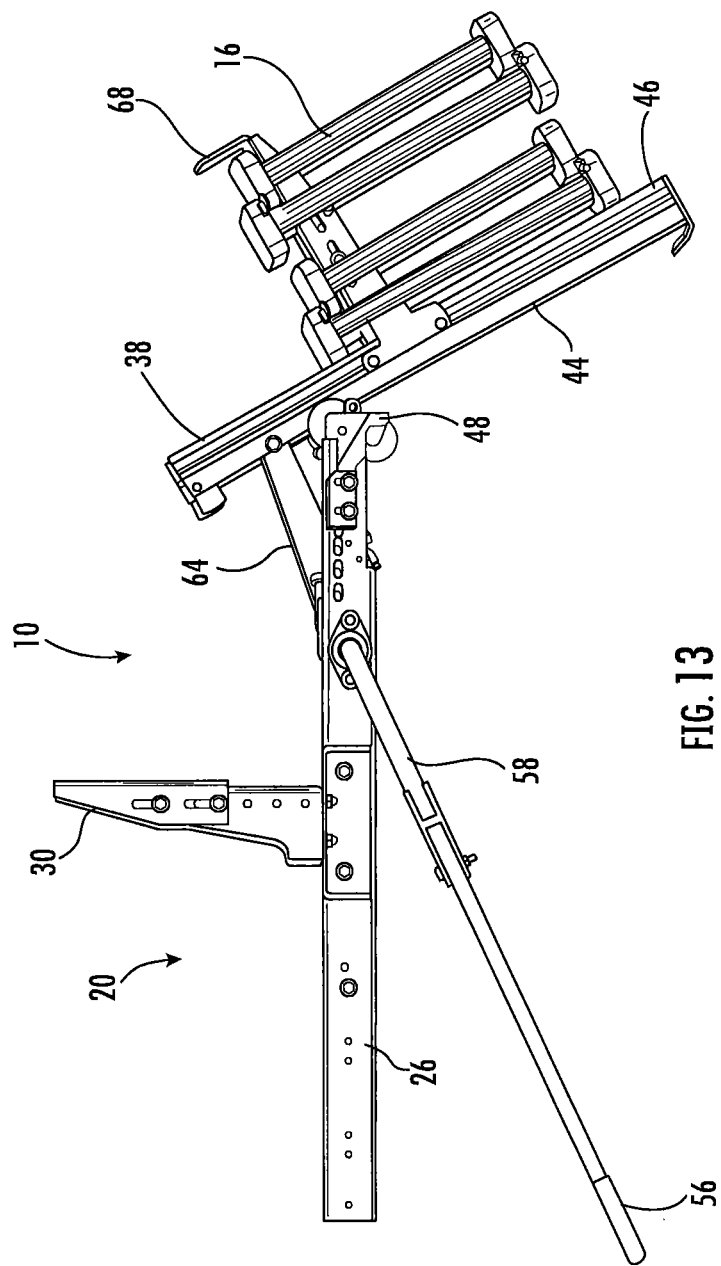
FIG. 13 is a schematic rear perspective view of a portion of the ladder rack system illustrated in FIGS. 1-12 wherein the ladder rack system is in the third position illustrated in FIGS. 11 and 12.

As best shown FIGS. 11-13, the lever arm 58 is rotated until the forward link member 62 and/or the rear link member 64 have contacted one of the link member stops 66 on the first roof rail 24 and the second roof rail 26, respectively in the third, or extended position. The first ladder rack rail 36 and second ladder rack rail 38 are further away from the first roof rail 24 and the second roof rail 26 in the third position than in the first or second positions. When the first ladder rack rail 36 and second ladder rack rail 38 are in extended positions, the ladders 16 on the ladder rack system 10 may be more easily accessible to a user. Thus, one or more ladders 16 can be loaded or unloaded from the first ladder rack rail 36 and the second ladder rack rail 38.

To move the first assembly 18 and the second assembly 20 back to the first/stowed position, the handle rod 56 or the lever arm 58 may be rotated in a second direction, which is generally opposite to the first direction. In one embodiment, the first direction is clockwise and the second direction is counterclockwise.

Figure 14:
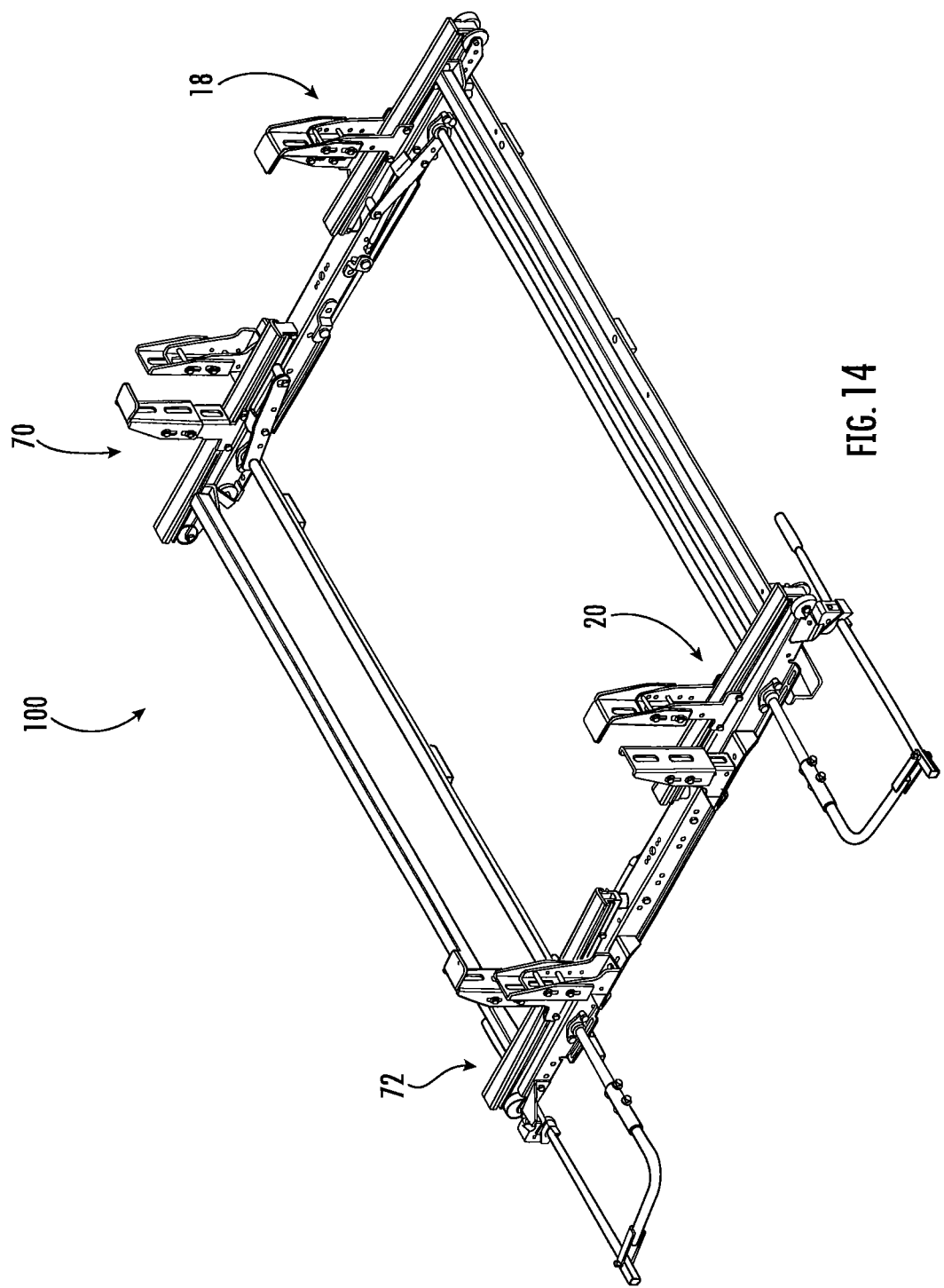
FIG. 14 is a schematic perspective view of an alternative embodiment of a ladder rack system wherein the ladder rack system is in a first position.
Figure 15:
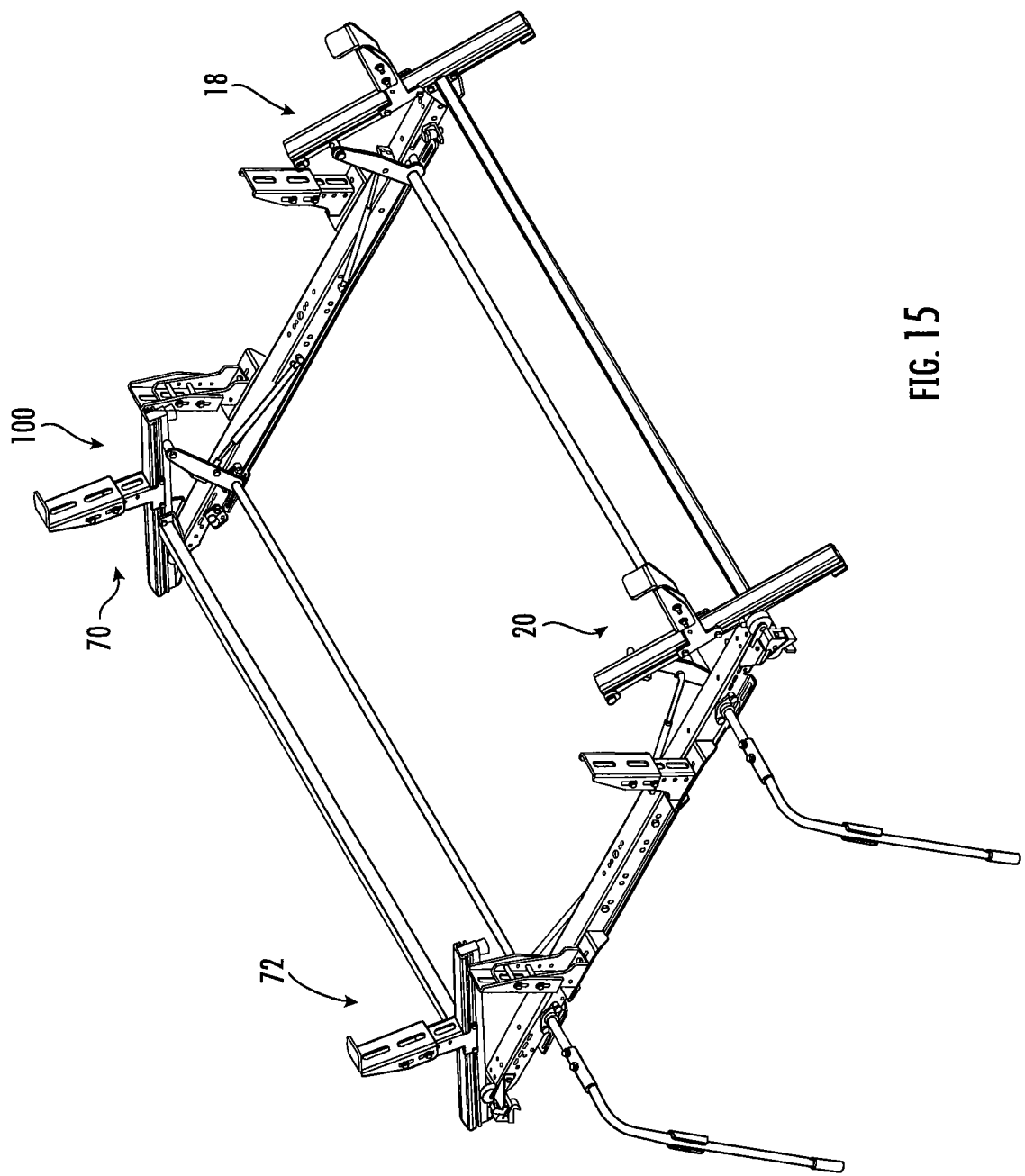
FIG. 15 is a schematic perspective view of the ladder rack system illustrated in FIG. 14 wherein the ladder rack system is in a second position.
Figure 16:
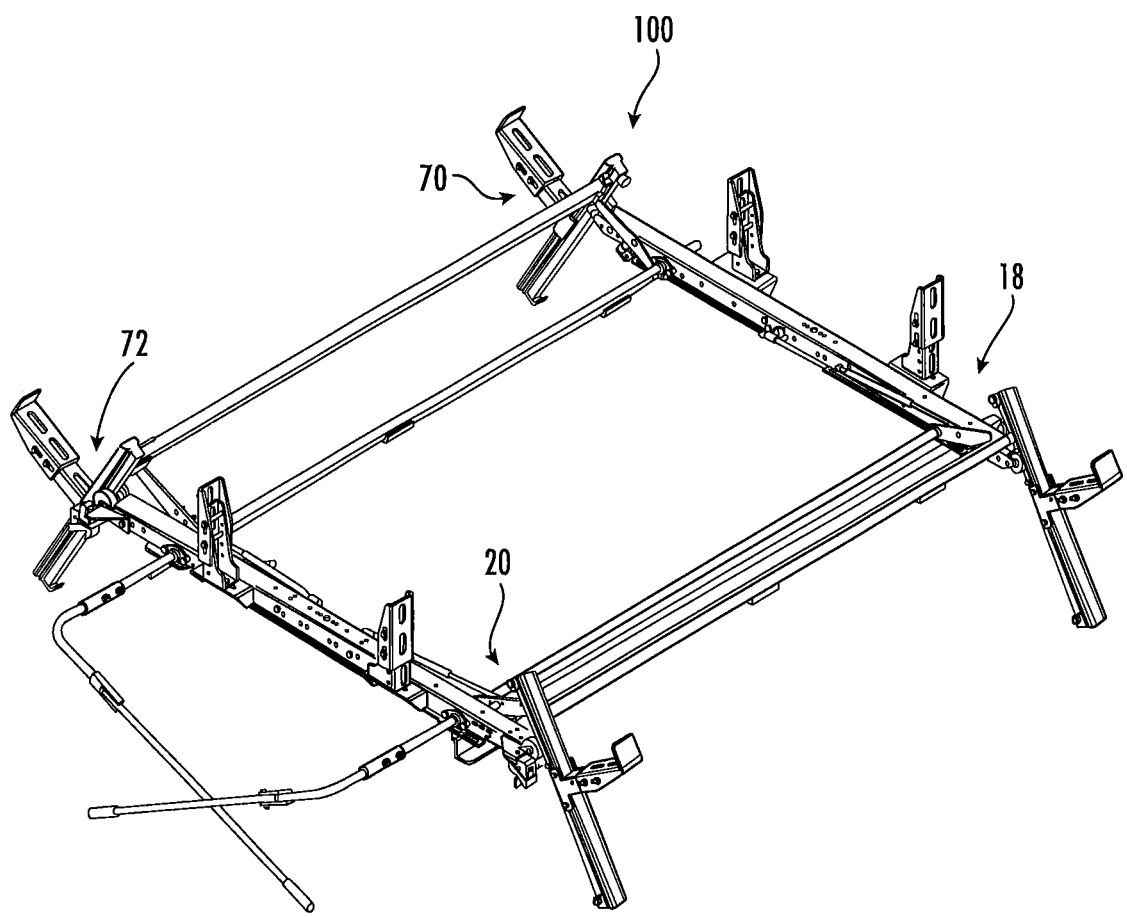
FIG. 16 is a schematic perspective view of the ladder rack system illustrated in FIGS. 14 and 15 wherein the ladder rack system is in a third position.

FIGS. 14-16 depict a ladder rack system 100 according to an alternative embodiment of the disclosure. The ladder rack system 100 includes a third assembly 70 and a fourth assembly 72, wherein the third assembly 70 and the fourth assembly 72 are mounted on an opposite side of the roof 14 of the vehicle 12 as the first assembly 18 and the second assembly 20. The third assembly 70 and the fourth assembly 72 have the same components, construction, and configuration as the first assembly 18 and the second assembly 20. The ladder rack system 100 is configured to accommodate additional stacked ladders on the roof 14 of the vehicle 12.

It is therefore to be understood that the various embodiments described in this specification and as illustrated in the attached drawings are simply exemplary embodiments illustrating the inventive concepts as defined in the claims. As a result, it is to be understood that the various embodiments described and illustrated may be combined to form the inventive concepts defined in the appended claims.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

What is claimed is:

1. A ladder rack system, comprising:
    a first ladder rack rail pivotably mounted at an angle to a stationary first roof rail and a second ladder rack rail pivotably mounted at an angle to a stationary second roof rail, wherein each of the first ladder rack rail and the second ladder rack rail comprises a roller on an end portion thereof;
    a rotatable connector bar extending transversely between and connected to each of the first roof rail and the second roof rail;
    a first arm extending vertically upward from the first roof rail and axially offset from the first ladder rack rail;
    a second arm extending vertically upward from the second roof rail and axially offset from the second ladder rack rail;
    a forward link member positioned transverse to the first roof rail and having a first end and a second end, wherein the first end of the forward link member is connected to a portion of the connector bar and the second end of the forward link member is pivotally connected to an inboard portion of the first ladder rack rail, wherein the forward link member is positioned at an angle with respect to the first ladder rack rail;
    a rear link member positioned transverse to the second roof rail and having a first end and a second end, wherein the first end of the rear link member is connected to a portion of the connector bar and the second of the rear link member is pivotally connected to an inboard portion of the second ladder rack rail, wherein the rear link member is positioned at an angle with respect to the second ladder rack rail;
    a link member stop mounted on an inboard portion of each of the first roof rail and the second roof rail, wherein the link member stops are proximately adjacent to each of the first end of the forward link member and the second end of the rear link member; and
    a ladder lock attached to each of the first ladder rack rail and the second ladder rack rail, wherein each of the ladder locks extend radially outward at an angle with respect to portions of each of the first ladder rack rail and the second ladder rack rail, and wherein each of the ladder locks are positioned outboard from the first and second arms.

2. The ladder rack system of claim 1, wherein each of the rollers includes a pair of wheels, wherein each of the wheels contact roller surfaces disposed on portions of each of the first ladder rack rail and the second ladder rack rail.

3. The ladder rack system of claim 2, wherein the roller surfaces are parallel and vertically offset from an upper surface on the first ladder rack rail and an upper surface on the second ladder rack rail.

4. The ladder rack system of claim 1, further comprising a transverse member extending between the first ladder rack rail and the second ladder rack rail, wherein the transverse member is substantially parallel to the connector bar.

5. The ladder rack system of claim 2, wherein the first ladder rack rail and the second ladder rack rail are each slideably engaged with one or more of the wheels.

6. The ladder rack system of claim 1, wherein each of the link member stops are interposed between the connector bar and one of the rollers.

7. The ladder rack system of claim 1, wherein the forward link member and/or the rear link member are in contact with at least one of the link member stops.

8. The ladder rack system of claim 1, wherein each of the ladder locks extends radially outward from the first ladder rack rail and the second ladder rack rail, and wherein each of the ladder locks accommodates at least two ladders thereon.

9. The ladder rack system of claim 8, wherein each of the ladder locks is positioned between the inboard portions and the outboard portions of the first ladder rack rail and the second ladder rack rail.

10. The ladder rack system of claim 8, wherein each of the ladder locks comprises a curved hook member.

11. The ladder rack system of claim 1, further comprising a rotatable lever extending through the rear roof rail and operatively connected to the connector bar.

12. The ladder rack system of claim 11, further comprising an elongated handle rod coupled to the lever via a fastener.

13. The ladder rack system of claim 1, wherein the first and second arms orient the first ladder rack rail and the second ladder rack rail, respectively, at an angle using a stoppers attached to upper surface of each of the first roof rail and the second roof rail.

14. The ladder rack system of claim 1, further comprising:
    a third ladder rack rail pivotably mounted to a stationary third roof rail; and
    a fourth ladder rack rail pivotably mounted to a stationary fourth roof rail, wherein the third roof rail and the fourth roof rail are positioned on an opposite side of the top of a vehicle as the first roof rail and the second roof rail.

* * * * *